United States Patent [19]

Goldman et al.

[11] 4,223,255

[45] Sep. 16, 1980

[54] ELECTRIC WHEEL

[76] Inventors: Gary S. Goldman, 412 Livingston Ave., Placentia, Calif. 92670; Allen W. Beishline, 5002 Van Buren St., Yorba Linda, Calif. 92868

[21] Appl. No.: 846,507

[22] Filed: Oct. 28, 1977

[51] Int. Cl.³ .............................................. H02K 29/00
[52] U.S. Cl. .................................................... 318/138
[58] Field of Search .................. 310/67 A; 290/9, 45; 318/138, 439

[56] References Cited

U.S. PATENT DOCUMENTS

| 2,104,707 | 1/1938 | Rawlings | 310/67 A |
| 3,884,317 | 5/1975 | Kinzel | 310/67 A |
| 3,917,988 | 11/1975 | Payne | 318/138 |
| 3,924,166 | 12/1975 | Doemen | 318/138 |
| 3,949,283 | 4/1976 | Okuyama et al. | 318/138 |

FOREIGN PATENT DOCUMENTS

2337696 6/1975 Fed. Rep. of Germany ........ 318/67 A

Primary Examiner—G. Rubinson
Assistant Examiner—W. E. Duncanson, Jr.
Attorney, Agent, or Firm—G. Donald Weber, Jr.

[57] ABSTRACT

An electric motor with microprogrammed controller and dual-functioning brushless commutation/rectification circuitry contained entirely within a wheel. The principal use of this electric motor is intended to be, but not limited to, powering a four-wheel drive electric vehicle through normal driving modes and serving as a power-recovery generator during braking. The magnetic and electronic configuration is optimized within the wheel to provide high torque and efficiency without the use of gear reductions, chain or belt drives, transmission, rotating axles, differentials, universal joints, or brushes. Power losses from mechanical drive system couplings are thus eliminated. Except for the wheel and bearings, there are no moving parts. Also, the wheel is virtually free of devices that are subject to mechanical failure.

34 Claims, 11 Drawing Figures

ELECTRIC WHEEL

BACKGROUND

1. Field of the Invention

This invention is directed at a prime mover, in general, and to a self-contained electro-magnetically driven power wheel, in particular.

2. Prior Art

Modern man relies extremely heavily on motorized vehicles for transportation. For individual movement, man relies nearly as heavily upon land based motorized vehicles. Primary among such vehicles is the automobile. However, conventional automobiles are now becoming a severe problem. For example, increasing costs and diminishing supplies of fossil fuels, the public's growing concern and awareness of the problem of air pollution and, to a lesser extent, the problem of noise pollution, have motivated inventors to search for a practical alternative to the internal combustion engine as a means of motive power for vehicles.

In the past, alternatives such as steam driven vehicles have been tried and discarded as impractical. More recently, electric cars have been viewed as a viable alternative.

Resistive motor speed controls, especially common to golf carts and the like, have been used. These controls operate smoothly, though inefficiently, at all but maximum speed. More recently, pulse-width modulation techniques in designs employing high-current Darlington transistors have been limited to the control of low-horsepower motors. These controls are load sensitive and operate at a frequency which tends to resonate field laminations of electric motors, thus producing an audible whining sound as well as having other objectionable characteristics.

In addition, alternative power sources have other drawbacks for use in vehicular applications. For example, battery operated vehicles have suffered from short range, low speed, and excessive weight. Also, recharge requirements impose long down-time periods. These shortcomings must be overcome before an electric vehicle becomes a viable alternative.

SUMMARY OF THE INVENTION

A compact, electric motor is provided. The motor is self-contained within a wheel unit so that a drive element is established. The motor provides a plurality of permanent magnets which interact, in a controlled manner, with electromagnets. A microprogrammed controller permits the magnets to interact in a manner to provide forward or reverse motion as well as a neutral position. In addition, electrical braking can be accomplished. The motor/wheel unit can be utilized with any suitable vehicle.

DESCRIPTION OF A PREFERRED EMBODIMENT

Figure 1:
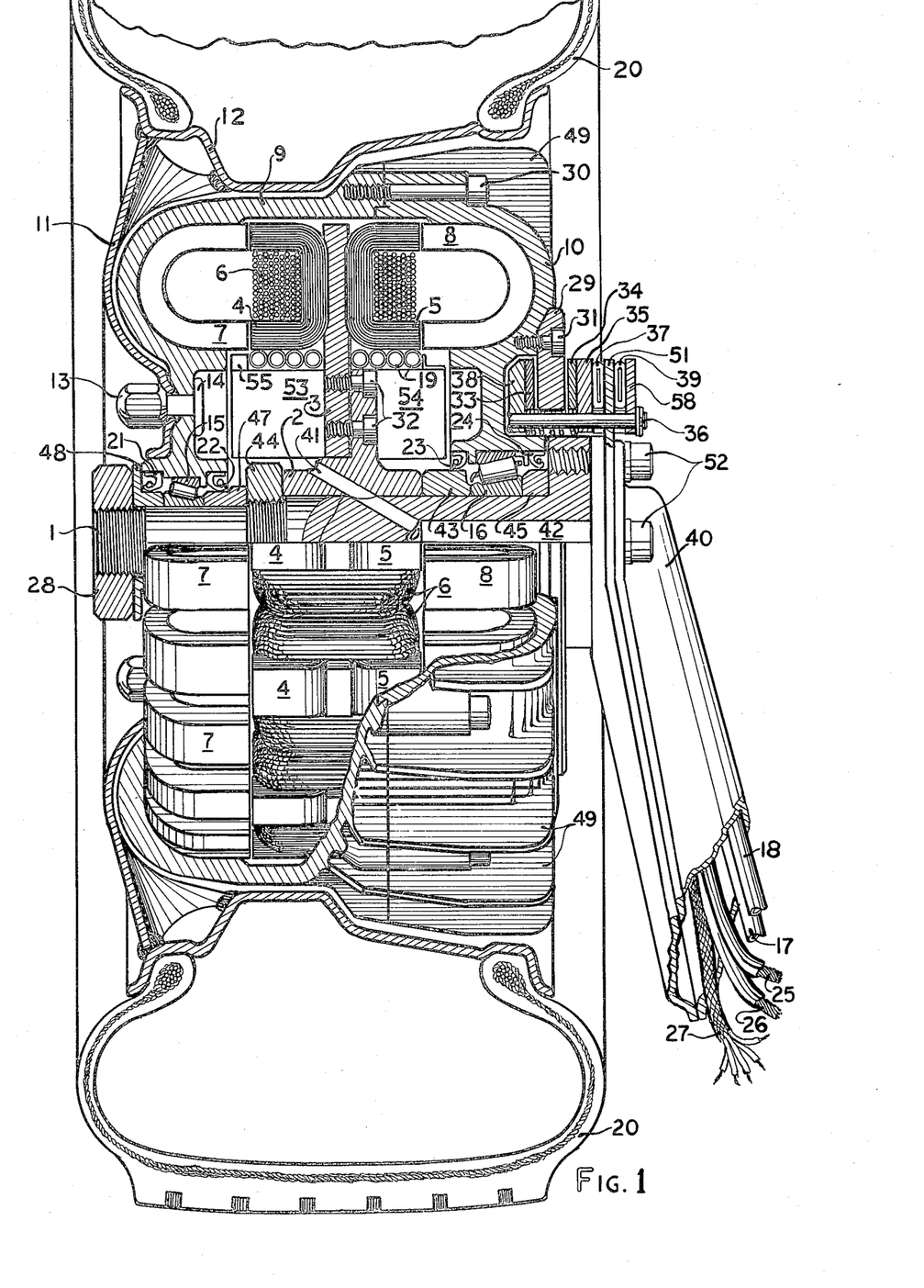
FIG. 1 is a cut away, cross-sectional view of the invention in a typical wheel configuration.

Referring now to FIG. 1, there is shown a cut away, cross-sectional view of a typical motor and a cross-section of the wheel within which it can be contained in accordance with the instant invention. The stationary shaft 1 of the motor is attached to a suitable suspension structure 40 which will not be described in detail. However, suspension structure 40 is provided with an axial opening (or channel) suitable for carrying power lines 25 and 26, and shielded control lines in multiple conductor cable 27. These lines pass through fixed axle 1 via a plurality of passages 41 and a common axial duct 42. In addition, passages 41 can also be utilized by coolant lines 19 if required in higher power versions of the motor. In the case of front suspension, the base of a McPhearson strut is attached to the axle using a similar pattern of machine bolts 52. The power leads 25 and 26 and the control lines 27, as well as coolant tubes 17 and 18 exit axially and loop in extra flexible connections, not shown.

Fixed upon shaft 1 is stator web 2 upon which a plurality of stator field support arms 3 are radially mounted by machine screws 32 or other suitable fasteners. In this embodiment, twelve stator field poles are provided, each having a support arm 3 which is preferably made of a non-magnetic material such as stainless steel. Mounted on each support arm 3 are two highly permeable, magnetic, C-core sections 4 and 5 which are affixed in a suitable manner, such as by epoxy and reinforced binding materials. The C-cores are, thus, back-to-back and axially disposed, as well as parallel to stationary shaft 1.

Figure 2:
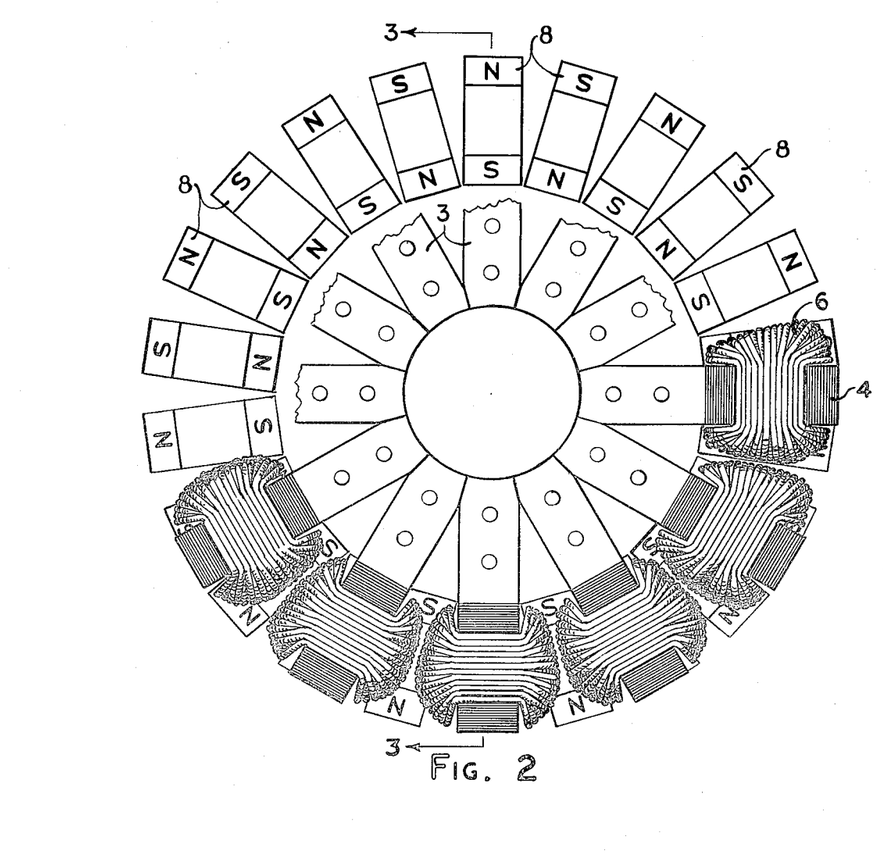
FIG. 2 is a partially broken-away plan view of the permanent magnet configuration for one-half of the rotating motor housing with stationary electromagnetic poles superimposed thereon.

Each of the stator field poles is wound in a radially-oriented, multi-layered helix or coil 6 which encompasses both of the C-core segments 4 and 5 with one continuous winding. Since each of the twelve electromagnetic field poles in this embodiment of the power wheel occupies most of a pie-shaped volume of about thirty degrees, some of the outer layers of the coil wires may be shaped into a wedge (as shown in FIG. 2) to conform to adjacent field pole windings.

The magnetic flux field which is induced in C-core segments 4 and 5, when current passes through winding 6, is divided or split into two axially-directed, symmetrical flux paths emerging on opposite sides of the coil.

In accordance with the invention, two sets of permanent magnet rotor poles 7 and 8 are arranged in dual annular rings to interact with the electromagnetic poles of cores 4 and 5. In this embodiment, each set of permanent magnets 7 and 8 includes twenty-two radially disposed, U-shaped magnets. The plane of rotation of the permanent magnet pole surfaces is established at an optimized gap spacing relative to the fixed electromagnetic poles 4 and 5. The gap spacing is determined by establishing the minimum spacing commensurate with the axial displacement freedom of the tapered roller bearings 15 and 16 under the normal pre-load operating conditions.

Molded into the outer motor shell 9, or fastened to it by suitable rivets or other fasteners, are six wheel-rim mounting studs 14 upon each of which is threaded wheel retainer nut 13. The retainer nuts 13 securely hold the specially formed spider 11 which is appropriately welded to the wheel rim 12 upon which a pneumatic tire 20 is mounted. Shell 10 is joined to shell 9 by means of machine screws 30 to form a complete housing for the wheel apparatus.

Figures 4, 4A, 5:
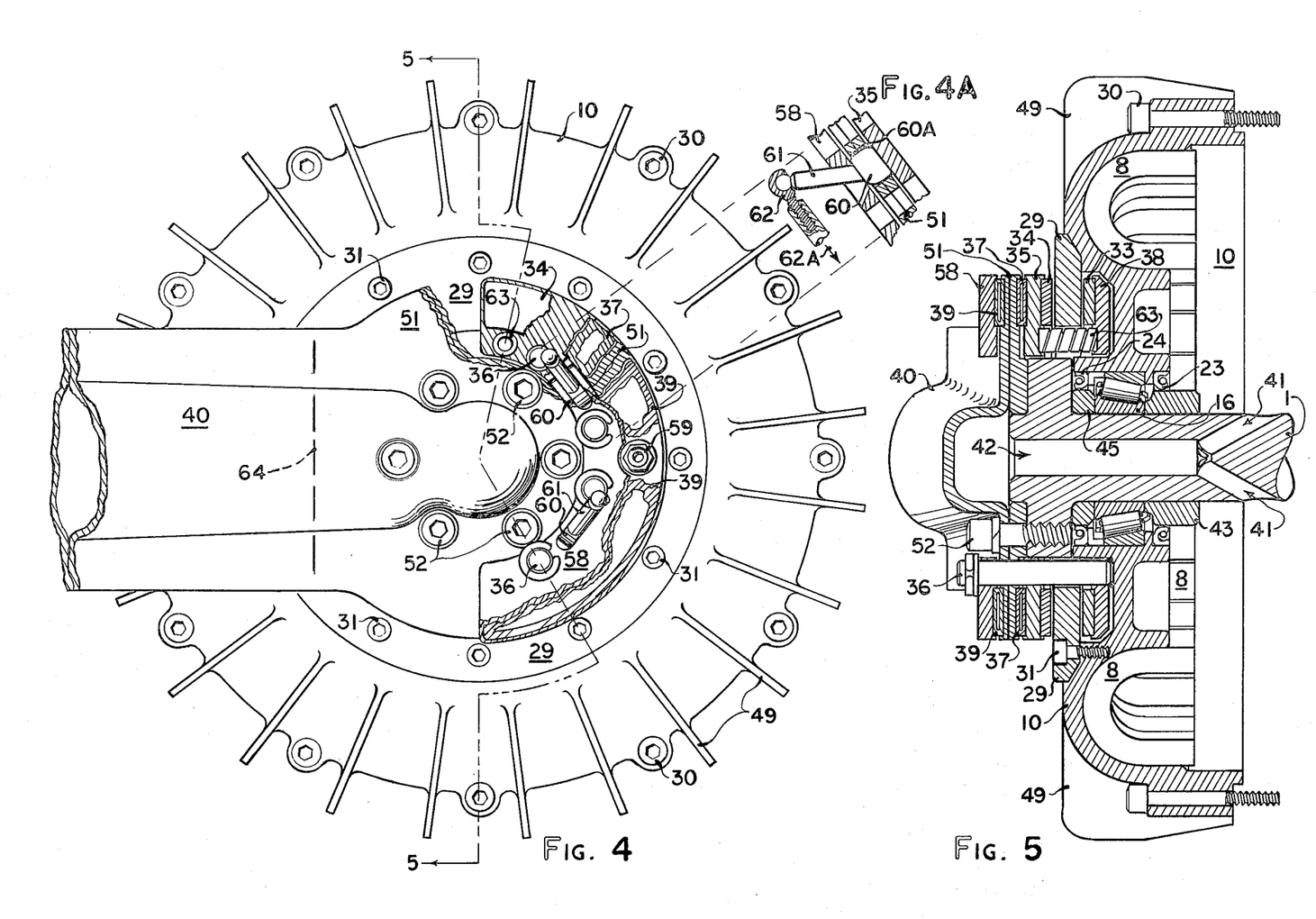
FIG. 4 is a plan view of the brake mechanism for the instant invention.
FIG. 4A is a detailed showing of a portion of the brake mechanism shown in FIG. 4.
FIG. 5 is a cross-sectional view of the combination hydraulic and mechanical brake mechanism as shown in FIG. 4.

Brake disc 29, described in greater detail relative to FIGS. 4 and 5, is an open-center annular ring, supported around its periphery by a plurality of machine screws 31 threaded into motor housing shell 10. Disc 29 is acted upon by a set of movable, double-ended caliper shoes 35 and 38 and the corresponding brake pads 33 and 34, when expansion cells 37 and/or 39 are inflated, for example, hydraulically. Coupling studs 36 transmit the gripping action between the inner and outer caliper shoes. The caliper assembly is supported by flange 51 which is an extension of suspension structure 40. The axle and stator assembly are attached to suspension structure 40 by a plurality of mounting bolts 52.

In the event continuous high power is required, as in climbing a long upgrade, cooling coils 19 can be used to cool electromagnetic coils 6 and cores 4 and 5, as well as electronic modules 53 and 54. The coolant is circulated via tubes 17 and 18 through structure 40, through hollow axle passage 42 and duct 41, to cooling coils 19, and back through a similar path to a suitable cooling radiator assembly (not shown). A fan (not shown) may be used to cool the radiator with the fan motor also being used to drive a circulating pump. In addition, fins 49 are provided, e.g. by molding, at the surface of motor housing 10 for providing cooling. The cooling can be provided by circulation of a coolant (e.g. air) or radiation of thermal energy.

Mounted upon stationary central axle 1, in annular compartments on either side of stator web 2 and field pole support arms 3, are electronic modules 53 and 54 which contain the dual functioning silicon-controlled rectifiers and microprogrammed controller, described in detail infra. These electronic circuits respond to Hall effect devices which are mounted within flux concentrator assemblies 55.

Outer shell 9 is rotatably supported by a set of tapered roller bearings 15. Lubricant for the bearings is retained within rotary seals 21 and 22, riding on seal seats 47 and 48, respectively. The seals and seats also serve to exclude, as much as possible, dirt and foreign particles which would subject the bearings to unnecessary wear.

Inboard permanent magnets 8 (in this embodiment twenty-two permanent magnets are used) are likewise attached to inner housing shell 10 by suitable potting adhesives or the like. Inner shell 10 is securely fastened to outer housing shell 9 by machine screws 30 and is rotatably supported on a tapered roller bearing set 16 which is held stationary on non-rotating axle 1 by a selected thickness combination seal seat and spacing washer 45. Washer 45 establishes the optimum air gap between the pole surfaces of inner permanent magnets 8 and the end surfaces of C-core segments 5. The inner hub of stator support spider 2 is retained in place during assembly, in particular, and during its operating life by retainer nut 44 which is threaded onto shaft 1. Bearing seals 23 and 24 provide both lubrication retention and foreign particle exclusion for bearing set 16. Seals 23 and 24 ride on seal seats 43 and 45, respectively (see also FIG. 5).

Another selected-thickness seal seat and spacing washer 48 establishes bearing pre-loads while also limiting the space between the fixed inner race cone of bearings 15 and 16 so that the optimum air gap between outer permanent magnets 7 and C-core segments 4 of the electromagnetic field poles can be maintained. The inner race cone of the outer bearing 15 is pressed inward by the outer seal seat 48 and an outer seal washer and wheel retaining nut 28.

Solid state commutation of electromagnetic poles 4 and 5 occurs in six distinct phase relationships (as described infra) that produce magnetic fields which interact with the twenty-two rotating permanent magnets 7 and 8 to provide a total of 132 steps per revolution of the power wheel. In general, the number of steps per revolution is given by the product of the total number of phases and the total number of permanent magnets. Corresponding poles of each set of permanent magnets 7 and 8 have like poles facing each other. Additionally, each successive magnet of a set must have its north and south poles arranged radially and alternately inward and outward. There is preferably an even number of permanent poles in each set. The twenty-two outboard permanent magnets 7 are attached to the outer motor housing shell 9 and are each held in place by suitable potting adhesives. Placement of the electromagnetic poles and the corresponding permanent magnet poles at the maximum attainable radial distance, provides the maximum torque or moment arm for the motor.

Referring now to FIG. 2, there is shown a partially broken-away view of the arrangement of the various magnets. In particular, FIG. 2 shows twenty-two permanent U-shaped magnets 8 arranged substantially equidistant from central shaft 1. It is seen that magnets 8 are arranged in alternating pole alignment. That is, alternate magnets 8 have north poles adjacent to south poles of the adjacent magnets. In addition, six (out of twelve) electromagnetic cores 4 and, thus, cores 5 are superimposed over permanent magnets 8. Cores 4 are supported by support arms 3 as described supra. Coils 6 are wound around cores 4 and 5 as noted. In addition, coils 6 tend to substantially fill the space between cores 4 and 5. Most importantly, FIG. 2 shows the overlapping arrangement of cores 4 and 5 relative to magnets 8. This overlapping arrangement assures improved operation of the invention.

Figure 3:
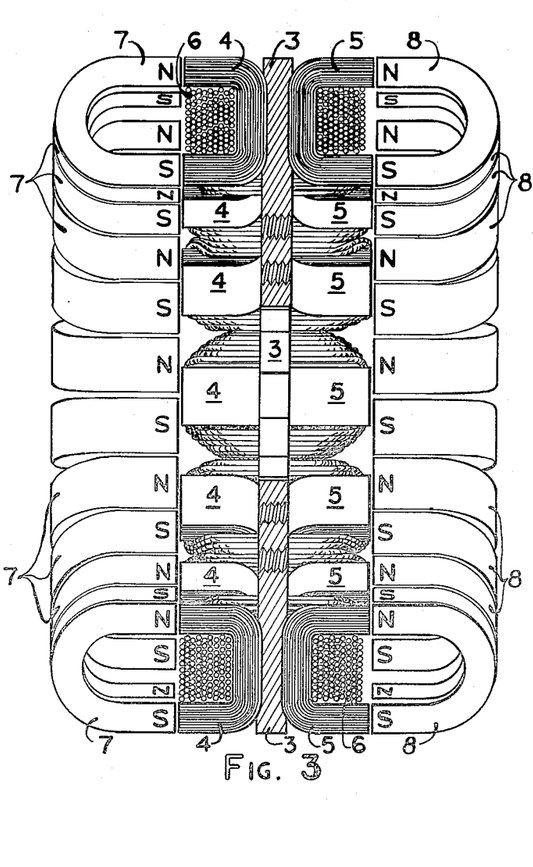
FIG. 3 is a partial cross-sectional view of the stator electro-magnets and the rotor permanent magnets.

Referring now to FIG. 3, there is shown a cross-sectional view of the arrangement of the magnets. Permanent magnets 7 and 8 form the outer and inner rotor poles, respectively. The alternating arrangement of north and south pole alignment for magnets 7 and 8 is depicted. Likewise, the alignment of cores 4 and 5 as well as the respective mutual coil 6 is illustrated. The overlapping arrangement of cores 4 and 5 relative to permanent magnets 7 and 8, respectively, is clear. In addition, the support arm 3 is clearly shown with respect to cores 4 and 5 as well as the mutual coil 6.

Reference is made concurrently to FIGS. 4 and 5. FIG. 4 is a partially broken-away plan view of the brake mechanism as associated with the instant invention. FIG. 5 is a cut away view of the brake mechanism shown from the inboard side of the trailing arm suspension in a typical rear wheel installation on an electric vehicle taken along the lines 5—5 in FIG. 4. Both hydraulically and mechanically actuated brakes are provided by the combination open center disc assembly 29 shown in FIGS. 4 and 5. In the case of front wheel suspension systems, trailing arm 40 would be replaced by the piston end of a commonly used McPhearson strut as suggested by dashed line 64.

Brake disc 29 is rigidly mounted to inboard motor shell 10 by a plurality of machine screws 31. The remaining brake assembly components are suspended from substantially disc-shaped extension 61 of trailing arm assembly 40 which is rigidly attached to non-rotating axle 1 by a plurality of machine screws 52.

Sandwiched between two substantially semi-circular reactor plates 35 and 58 are two semi-circular diaphragms 37 and 39 made of a suitable material, such as a synthetic rubber or silicon compound capable of withstanding the maximum temperatures anticipated to be generated in the application of the brakes. In a preferred embodiment, hydraulic fluid is supplied to both diaphragms simultaneously through fitting 59 which is affixed to stationary support extension 51. Upon actuation of hydraulic braking, fluid causes diaphragms 37 and 39 to expand thereby forcing the semi-circular brake shoe 35 outwardly toward disc 29 and causing brake pad 34 to engage the inboard surface of disc 29. Simultaneously, the expansion of diaphragm 39 causes reactor plate 58 to move away from extension 51. The four pull-rods 36, which are attached to semi-circular brake shoe 38, are moved thereby causing brake pads 33 to engage the outboard surface of brake disc 29. Upon release of the hydraulic pressure, three compression springs 63 force the brake shoes apart so that disc 29 can again turn freely.

Because it is required by law to provide emergency braking capability and the additional need for parking brakes, provision is made for mechanical actuation of the brakes by a parking brake lever and known systems of cabling. Referring to FIG. 4 and the detail of FIG. 4A there are shown the unique components of the parking brake system. Between each of the two pairs of pull-rods 36, is a cam 60 which is affixed to actuator rod 61. Each cam is captivated by the respective cutout 60A shown in plate 51 and by reactor plates 35 and 58. The reactor plates are forced toward each other (and away from disc 29) by brake shoe separator springs 63. When drag link 62 is moved in the direction of arrow 62A, cam 60 causes reactor plates 35 and 58 to separate in the same manner as when the hydraulic diaphragms 37 and 39 are pressurized, thereby causing the application of brake pads 33 and 49 against brake disc 29.

It can be seen that the two cams can be rotated by two short drag links 62 which have their other ends attached to a double bell crank (not shown) of known configuration pivoted on the axis of the main axle, or in any number of simple linkages and flexible cable arrangements that can be actuated by application of a typical parking or emergency brake lever or pedal.

Figure 6A:
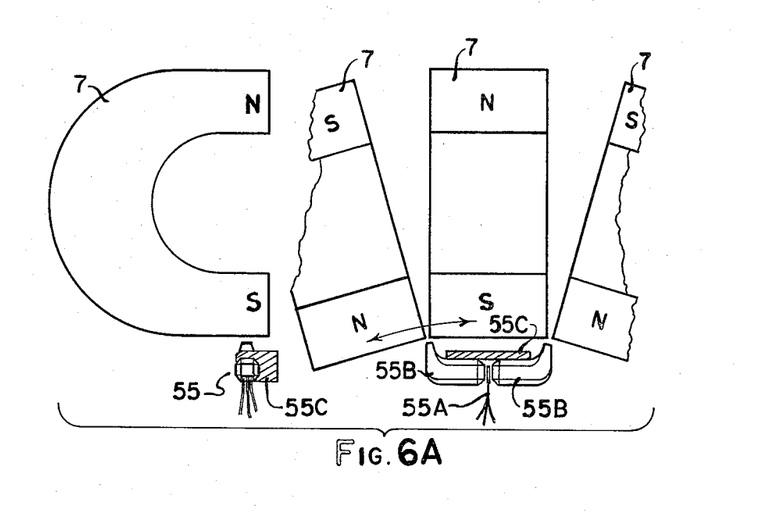
FIGS. 6A and 6B are alternative permanent magnet configurations using linear magnetic elements with added pole pieces.
Figure 6B:
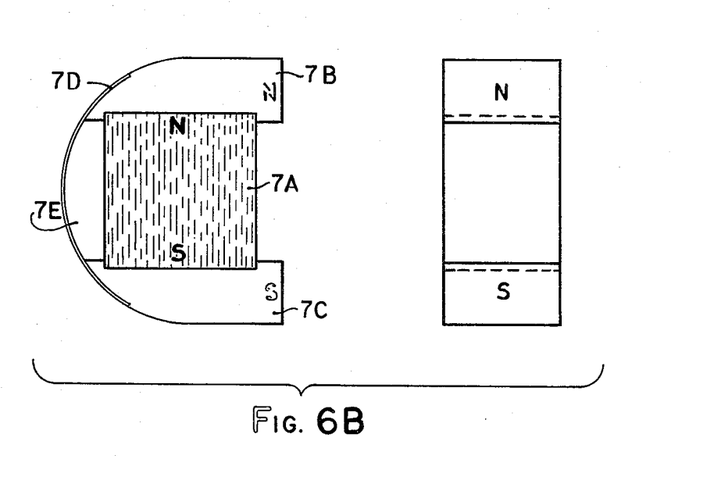

FIGS. 6A and 6B show two views each of alternative configurations of the permanent magnets 7 or 8 (see FIGS. 1-3) which offer certain advantages in the invention. FIG. 6A shows details of Hall effect sensor 55A and flux concentrator poles 55B. Partially broken-away views of adjacent magnets are included to show the physical relationships needed for proper commutation as the magnetic poles move in either direction, forward or reverse, as depicted by the double-ended arrow, while the assembly 55 remains stationary. The cross-sectioned areas 55C represent sections through non-magnetic clamp material.

The magnet of FIG. 6A is much thicker in the curved section than U-shaped permanent magnets 7 and 8 in earlier figures. This alternative provides appreciable gain in total flux and retentivity using materials such as Alnico V.

In FIG. 6B, an alternative composite version is shown wherein a linear or grain-oriented magnetic material such as Alnico 8 or 9, or a rare-earth ceramic such as Samarium-Cobalt is used in portion 7A of the magnet. Pole pieces 7B and 7C are highly permeable material such as cast iron or Armco magnetic iron. Leakage flux shunting strap 7D is also a highly permeable ribbon. Block 7E can be non-magnetic aluminum, plastic filler or the like which serves to keep the basic form factor, if interchangability of magnetic cores is deemed desirable.

Figure 7:
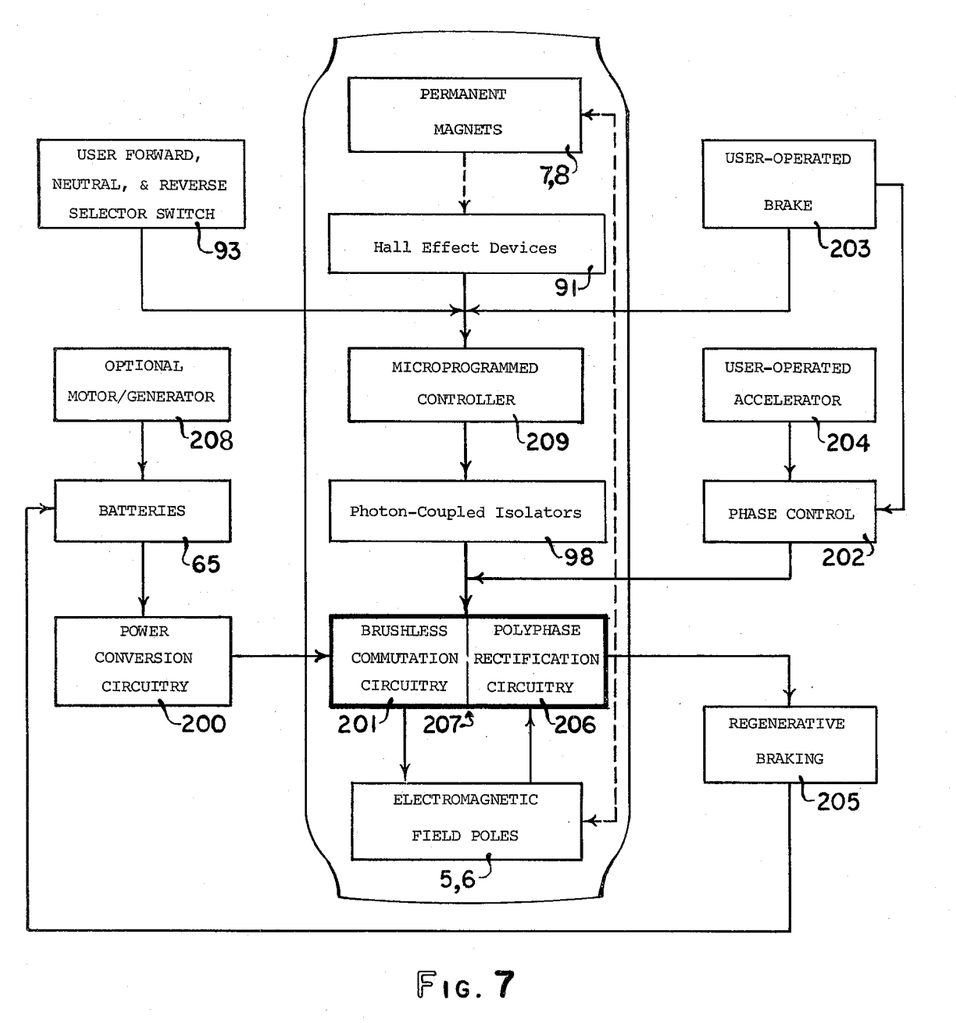
FIG. 7 is a block diagram of the magnetic and electronic hardware configuration of the instant invention.

FIG. 7 is a block diagram of the magnetic and electronic hardware configuration, wherein the dotted lines indicate magnetic field couplings and the solid lines indicate electrical connections. The configuration shows the arrangement of components, the general flow of power and control signals, and primary functions of the invention. Thus, power conversion circuitry 200, consisting of a high-frequency inverter, is connected to brushless commutation circuitry 201, which, in turn, is connected to electromagnetic field poles 5. This sequential path is applicable during motor operation of the invention. During generator operation, the voltage induced in electromagnetic field poles 5 is supplied to polyphase rectification circuitry 206, which, in turn, is connected to regenerative braking circuitry 205. Positive and negative switching regulators, included in the regenerative braking circuitry 205, return power to batteries 65. Optional motor/generator 208 of any known configuration is also connected to batteries 65.

The bi-directional path in FIG. 7, indicated by the two arrows between electromagnetic field poles 5 and brushless commutation/polyphase rectification unit 207, illustrates that the individual functions of brushless commutation circuitry 201 and polyphase rectification circuitry 206 are both implemented using a single electronic configuration that satisfies the dual motor/generator operating requirements. Likewise, a single phase control unit 202 is connected to brushless commutation/polyphase rectification unit 207 to adjust both the degree of acceleration and braking of the invention in response to user-operated accelerator 204 and user-operated brake 203, respectively.

Entirely within the wheel housing is microprogrammed controller 209 which receives input signals from user-operated forward, neutral, and reverse selector switch 93, user-operated brake 203, and Hall effect devices 91. Controller 209 supplies control signals to photon-coupled isolators 98, which, in turn, control brushless commutation/polyphase rectification unit 207. The commutation/polyphase rectification unit 207 consists of dual-functioning silicon-controlled rectifiers. Permanent magnets 7, 8 which influence the output states of Hall effect devices 91 and interact with electromagnetic poles 5 are also shown.

Figure 8:
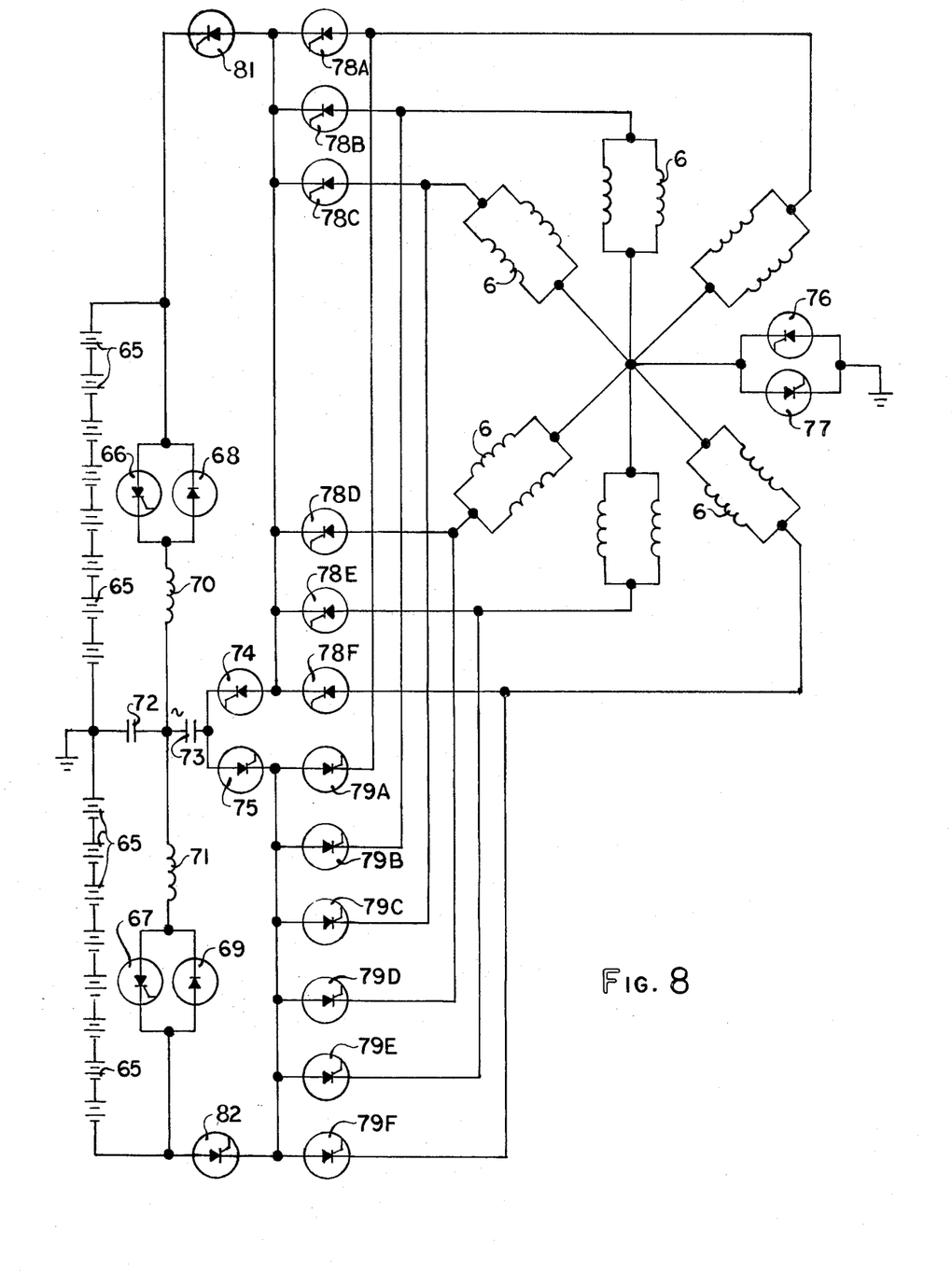
FIG. 8 is a schematic diagram of the power conversion circuitry with commutation and polyphase rectification provisions.

The power conversion circuitry 200 and brushless commutation/polyphase rectification circuitry 207 are illustrated in greater detail in the schematic diagram of FIG. 8. A plurality, for example sixteen, six-volt, deep discharge batteries 65 are connected in series. Of course, improved lead-acid batteries, other chemical batteries, or futuristic power sources with greater kilowatt-per-pound capability are contemplated for use with the design to provide greater range capability of a vehicle equipped with this invention.

The power inverter circuitry 200 consists of two inverter silicon-controlled rectifiers 66 and 67, two fast-recovery rectifiers 68 and 69, and commutation capacitor 72. A properly chosen resistor-capacitor snubber network (not shown) can be connected across each SCR 66 and 67 to minimize ringing and suppress voltage transients. Fast recovery rectifiers 68 and 69 aide in minimizing radio-frequency-interference generated by the inverter circuitry, and provide current return paths to batteries 65 during reverse current flow when turn-off time is cyclically presented to silicon-controlled rectifiers 66 and 67, respectively. Inductors 70 and 71 are each wound on separate molybdenum or other suitable high permeability cores.

The upper limit on the high-frequency operation of the inverter, which contributes compactness and efficiency of the circuitry, is limited by the turn-off time parameters associated with inverter SCRs 66 and 67, and the load impedance characteristics of the electromagnetic field pole windings 6.

Capacitor 73 is connected in series with the invertr load and serves a current limiting function during the peak current flow associated with the particularly high starting torque of the invention.

In the embodiment shown in FIG. 8, the inverter circuitry is directly coupled (not transformer coupled) to the electromagnetic field pole windings 6. Thus, the inverter load is represented as the average combined impedance of the electromagnetic pole pair windings. This specific configuration takes advantage of the inherent characteristic of the inverter to operate effectively into varying inductive loads. In addition, the inherent power losses that are characteristic of transformer coupled configurations are obviated.

During motor operation of the invention, the high-frequency AC output signal of the inverter is full-wave phase controlled in a known fashion through SCRs 76 and 77. Meanwhile SCRs 74 and 75 are triggered into full conduction and SCRs 81 and 82 remain in the non-conducting (blocking) state. During generator operation of the invention, SCRs 74 and 75 are placed in the blocking state, thus completely isolating the inverter output from electromagnetic field pole pair windings 6. The six-phase voltage waveform induced in the electromagnetic pole pair windings 6 is full-wave, phase controlled through SCRs 76 and 77 and returned to batteries 65 via SCRs 81 and 82 which are triggered into full conduction, thus effecting regenerative braking. Since the generated voltage may be insufficient to effect regenerative braking, a mechanical friction brake supplements the braking process, particularly at slow vehicle speeds and for parking as described supra. In a known fashion, conventional schemes can be employed for paralleling series connected batteries 65 to accommodate regenerative braking at lower vehicle speeds and thus, lower generator output voltages. However, in the preferred embodiment of the regenerative braking circuitry, the use of positive and negative switching regulators (not shown) provide a constant output over a wide variation in input voltage. The positive and negative switching regulators simultaneously charge all series connected batteries and at the same time eliminate the plurality of mechanical, high-current, DC switches required by other battery-paralleling schemes.

Figure 9:
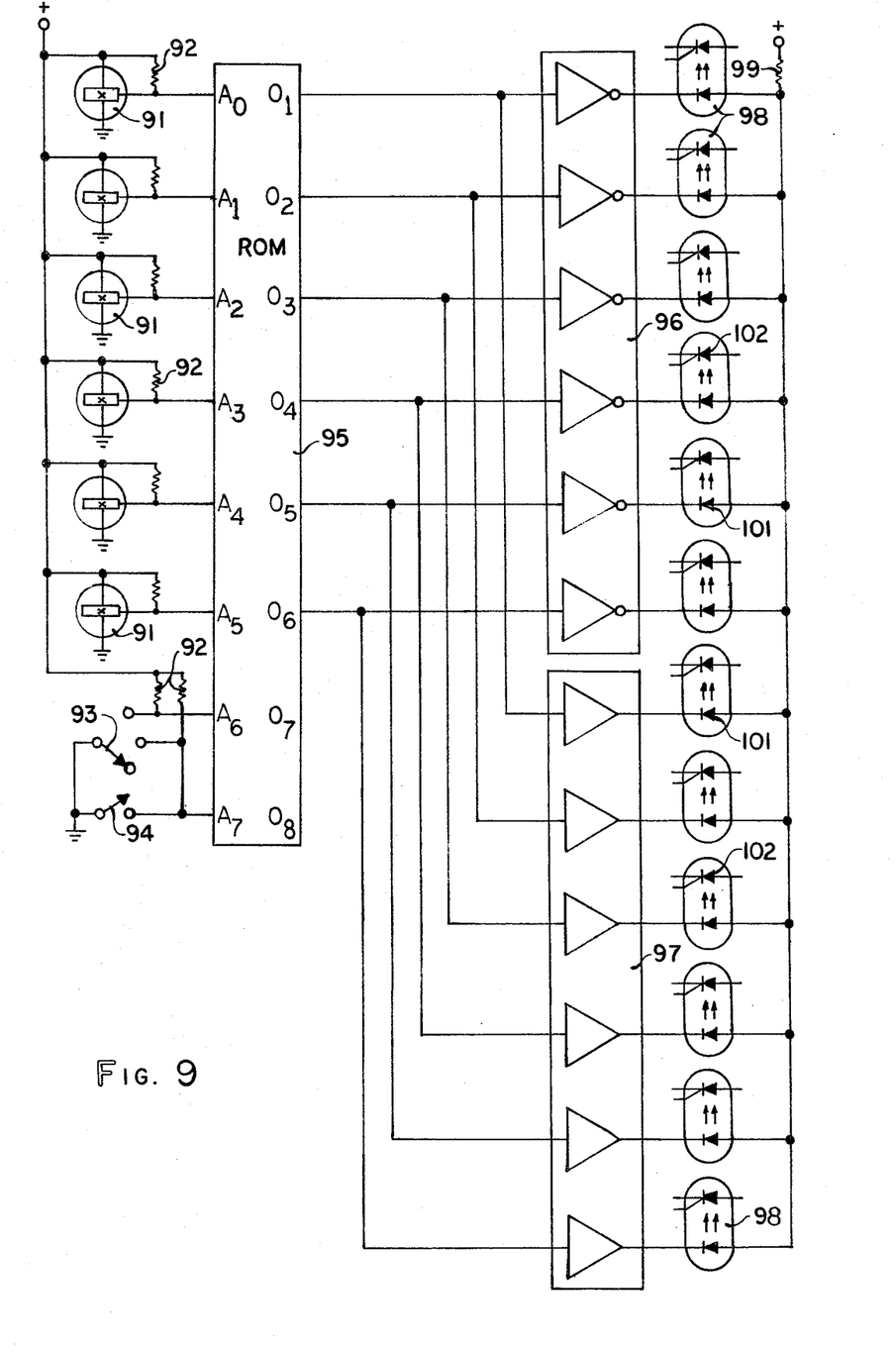
FIG. 9 is a schematic diagram of the basic microprogrammed controller.

In accordance with the invention, commutation of the electromagnetic field poles 6, is achieved utilizing a cyclo-inverter waveform consisting of a high-frequency, full-wave, phase-controlled, AC voltage, modulated by the comparatively slower switching frequency of Hall effect sensors 55 in the microprogrammed controller circuitry shown in detail in FIG. 9. The electromagnetic field pole windings 6 are switched by the matrix connection of SCR pairs 78 and 79. Rotational torque is thus achieved by directing current flow through each independently controlled electromagnetic field pole pair winding in such a manner as to produce a magnetic field which attracts the closest approaching permanent magnet on the rotor, and likewise, repels the adjacent departing permanent magnet. Torque developed by the power wheel is a function of the magnitude of the magnetic flux field and the effective magnitude of the electromagnetic field pole current.

Also in accordance with the invention, an emergency stop can be implemented by utilizing a principle, herein referred to as counter magnetic field braking. An emergency braking condition can be determined in a known fashion by sensing the rate of change in the application of the user-operated brake pedal. In an emergency stop, SCRs 81 and 82 revert to a blocking state and power is immediately phase controlled and applied to the electromagnetic field pole pair windings 6. While the vehicle is traveling in a forward direction, however, the electromagnetic pole pairs are commutated as if in the reverse mode. The resulting counter electromagnetic field produced attempts to reverse the rotation of the wheel. Counter magnetic field braking is possible due to the unique magnetic drive coupling of the invention and the complete absence of mechanical drive interfaces.

FIG. 9 is a detailed schematic diagram of a preferred embodiment of microprogrammed controller 209. Controller 209 employs six single-ended, three-terminal Hall effect devices 91. Each Hall effect device is mounted on a flux concentrator assembly 55 (see FIG. 6A). Source current is supplied to read-only memory 95 (ROM) address lines $A_0$ through $A_7$ via eight pull-up resistors 92. Single-pole, triple-throw switch 93 selects forward, neutral, or reverse operating modes, while single-pole, single-throw switch 94 enables polyphase rectification for regenerative braking. Switches 93 and 94 are both user-operated and are the only components in FIG. 9 which are external to wheel housing 9, 10. The output lines $O_1$ through $O_6$ of ROM 95 are connected to directly drive the inputs of hex inverter buffer 96 and hex buffer 97, which in turn, drive optoelectronic devices, such as infrared emitting diodes (IREDs) 101 within the photon-coupled isolators 98. The matrix connection between the output lines of ROM 95 and the input lines of hex inverter buffer 96 and hex buffer 97, ensures that exactly six of the twelve buffer output lines will be low at any given instant. Thus, specification of resistor 99 is based upon the continuous current requirements of six IREDs. Each light-activated silicon-controlled rectifier (LASCR) 102 within the photon-coupled isolators 98 controls the similarly oriented power SCR 78, 79 in the schematic diagram of FIG. 8. A resistor which determines the input current to trigger, is typically connected between the gate and cathode of each LASCR 102. Also, a series current-limiting resistor (not shown) is typically connected between the anode of each power SCR in FIG.

8 and the anode of the similarly oriented LASCR in FIG. 9. The cathode of each LASCR 102 is connected to the gate of the similarly oriented power SCR, thus providing a sensitive gate trigger which commutates the controlled power SCR "on" each time the corresponding IRED 101 is forward biased.

Microprogrammed controller 209, in accordance with the invention, performs five controlling functions: brushless commutation of the motor in both forward and reverse modes; polyphase rectification of the generator in both forward and reverse modes; and neutral. Since both the neutral function and forward polyphase rectification function produce identical ROM outputs in the electronic circuitry of FIG. 9, only four distinct functions are actually realized. These four functions are implemented through utilization of a 2048-bit, custom-masked, bipolar ROM (256×8 bit ROM), depicted as ROM 95 in FIG. 9. In general, microprogrammed ROM 95 requires a minimum number of addressable words given by $m \cdot 2^n$, where m is the number of distinct control functions and n is the number of phases.

Table I contains the 256 addressable words and corresponding eight-bit, binary output codes which define the custom ROM mask. The output bits are read from right to left in Table I and correspond to ROM output lines $O_1$ through $O_8$ in FIG. 9. Commutation of the six electromagnetic pole pairs is influenced only by output lines $O_1$ through $O_6$. Since output lines $O_7$ and $O_8$ are not utilized, they have been arbitrarily set to "1". Thus, each output in the table is of the form "11XXXXXX". However, of course, any size ROM can be used if other functions are desired. In addition, a different ROM mask can be established if desired.

Words 0 through 63 accommodate regenerative braking commutation of the invention when operating as a generator in the reverse mode; words 64 through 127 accommodate both the neutral mode and regenerative braking commutation of the invention when operating as a generator in the forward mode; words 128 through 191 and words 192 through 255 accommodate commutation of the invention when operating as a motor in the reverse and forward modes, respectively.

Six hall effect devices 91 and two switches 93, 94 shown in FIG. 9 supply the eight-bit word address information to ROM 95. The output bits corresponding to words 0 through 127 and words 128 through 256 are derived from the analysis of the six-phase voltage waveform generated by the invention, and the six-phase cyclo-inverter waveform supplied to the electromagnetic field poles of the invention, respectively.

Thus, there has been shown and described an electronically driven wheel which is substantially independent of external components. The wheel operates in forward, reverse, or neutral modes. The wheel is the motor with microprogrammed controller and dual-functioning commutation/rectification circuitry contained entirely within a wheel.

TABLE 1

| WORD | OUTPUT | WORD | OUTPUT | WORD | OUTPUT | WORD | OUTPUT |
|---|---|---|---|---|---|---|---|
| 0 | 11000000 | 64 | 11111111 | 128 | 11111111 | 192 | 11000000 |
| 1 | 11001000 | 65 | 11110111 | 129 | 11111110 | 193 | 11000001 |
| 2 | 11010000 | 66 | 11101111 | 130 | 11111101 | 194 | 11000010 |
| 3 | 11011000 | 67 | 11100111 | 131 | 11111100 | 195 | 11000011 |
| 4 | 11100000 | 68 | 11011111 | 132 | 11111011 | 196 | 11000100 |
| 5 | 11101000 | 69 | 11010111 | 133 | 11111010 | 197 | 11000101 |
| 6 | 11110000 | 70 | 11001111 | 134 | 11111001 | 198 | 11000110 |
| 7 | 11111000 | 71 | 11000111 | 135 | 11111000 | 199 | 11000111 |
| 8 | 11000001 | 72 | 11111110 | 136 | 11110111 | 200 | 11001000 |
| 9 | 11001001 | 73 | 11110110 | 137 | 11110110 | 201 | 11001001 |
| 10 | 11010001 | 74 | 11101110 | 138 | 11110101 | 202 | 11001010 |
| 11 | 11011001 | 75 | 11100110 | 139 | 11110100 | 203 | 11001011 |
| 12 | 11100001 | 76 | 11011110 | 140 | 11110011 | 204 | 11001100 |
| 13 | 11101001 | 77 | 11010110 | 141 | 11110010 | 205 | 11001101 |
| 14 | 11110001 | 78 | 11001110 | 142 | 11110001 | 206 | 11001110 |
| 15 | 11111001 | 79 | 11000110 | 143 | 11110000 | 207 | 11001111 |
| 16 | 11000010 | 80 | 11111101 | 144 | 11101111 | 208 | 11010000 |
| 17 | 11001010 | 81 | 11110101 | 145 | 11101110 | 209 | 11010001 |
| 18 | 11010010 | 82 | 11101101 | 146 | 11101101 | 210 | 11010010 |
| 19 | 11011010 | 83 | 11100101 | 147 | 11101100 | 211 | 11010011 |
| 20 | 11100010 | 84 | 11011101 | 148 | 11101011 | 212 | 11010100 |
| 21 | 11101010 | 85 | 11010101 | 149 | 11101010 | 213 | 11010101 |
| 22 | 11110010 | 86 | 11001101 | 150 | 11101001 | 214 | 11010110 |
| 23 | 11111010 | 87 | 11000101 | 151 | 11101000 | 215 | 11010111 |
| 24 | 11000011 | 88 | 11111100 | 152 | 11100111 | 216 | 11011000 |
| 25 | 11001011 | 89 | 11110100 | 153 | 11100110 | 217 | 11011001 |
| 26 | 11010011 | 90 | 11101100 | 154 | 11100101 | 218 | 11011010 |
| 27 | 11011011 | 91 | 11100100 | 155 | 11100100 | 219 | 11011011 |
| 28 | 11100011 | 92 | 11011100 | 156 | 11100011 | 220 | 11011100 |
| 29 | 11101011 | 93 | 11010100 | 157 | 11100010 | 221 | 11011101 |
| 30 | 11110011 | 94 | 11001100 | 158 | 11100001 | 222 | 11011110 |
| 31 | 11111011 | 95 | 11000100 | 159 | 11100000 | 223 | 11011111 |
| 32 | 11000100 | 96 | 11111011 | 160 | 11011111 | 224 | 11100000 |
| 33 | 11001100 | 97 | 11110011 | 161 | 11011110 | 225 | 11100001 |
| 34 | 11010100 | 98 | 11101011 | 162 | 11011101 | 226 | 11100010 |
| 35 | 11011100 | 99 | 11100011 | 163 | 11011100 | 227 | 11100011 |
| 36 | 11100100 | 100 | 11011011 | 164 | 11011011 | 228 | 11100100 |
| 37 | 11101100 | 101 | 11010011 | 165 | 11011010 | 229 | 11100101 |
| 38 | 11110100 | 102 | 11001011 | 166 | 11011001 | 230 | 11100110 |
| 39 | 11111100 | 103 | 11000011 | 167 | 11011000 | 231 | 11100111 |
| 40 | 11000101 | 104 | 11111010 | 168 | 11010111 | 232 | 11101000 |
| 41 | 11001101 | 105 | 11110010 | 169 | 11010110 | 233 | 11101001 |
| 42 | 11010101 | 106 | 11101010 | 170 | 11010101 | 234 | 11101010 |
| 43 | 11011101 | 107 | 11100010 | 171 | 11010100 | 235 | 11101011 |
| 44 | 11100101 | 108 | 11011010 | 172 | 11010011 | 236 | 11101100 |

TABLE 1-continued

| WORD | OUTPUT | WORD | OUTPUT | WORD | OUTPUT | WORD | OUTPUT |
|------|----------|------|----------|------|----------|------|----------|
| 45 | 11101101 | 109 | 11010010 | 173 | 11010010 | 237 | 11101101 |
| 46 | 11110101 | 110 | 11001010 | 174 | 11010001 | 238 | 11101110 |
| 47 | 11111101 | 111 | 11000010 | 175 | 11010000 | 239 | 11101111 |
| 48 | 11000110 | 112 | 11111001 | 176 | 11011111 | 240 | 11110000 |
| 49 | 11001110 | 113 | 11110001 | 177 | 11001110 | 241 | 11110001 |
| 50 | 11010110 | 114 | 11101001 | 178 | 11001101 | 242 | 11110010 |
| 51 | 11011110 | 115 | 11100001 | 179 | 11001100 | 243 | 11110011 |
| 52 | 11100110 | 116 | 11011001 | 180 | 11001011 | 244 | 11110100 |
| 53 | 11101110 | 117 | 11010001 | 181 | 11001010 | 245 | 11110101 |
| 54 | 11110110 | 118 | 11001001 | 182 | 11001001 | 246 | 11110110 |
| 55 | 11111110 | 119 | 11000001 | 183 | 11001000 | 247 | 11110111 |
| 56 | 11000111 | 120 | 11111000 | 184 | 11000111 | 248 | 11111000 |
| 57 | 11001111 | 121 | 11110000 | 185 | 11000110 | 249 | 11111001 |
| 58 | 11010111 | 122 | 11101000 | 186 | 11000101 | 250 | 11111010 |
| 59 | 11011111 | 123 | 11100000 | 187 | 11000100 | 251 | 11111011 |
| 60 | 11100111 | 124 | 11011000 | 188 | 11000011 | 252 | 11111100 |
| 61 | 11101111 | 125 | 11010000 | 189 | 11000010 | 253 | 11111101 |
| 62 | 11110111 | 126 | 11001000 | 190 | 11000001 | 254 | 11111110 |
| 63 | 11111111 | 127 | 11000000 | 191 | 11000000 | 255 | 11111111 |

While the discussion is directed to a specific embodiment of a wheel for a four-wheel drive automobile, usage of the invention with diverse applications ranging from electric wheelchairs to electric boats is contemplated. The innovativeness of the wheel includes unique size, magnetic and electrical assemblies, efficiency, torque, and speed characteristics. Modifications of any specific embodiment will be dictated by the given application, existing standards or codes, and electric motor-/generator requirements.

Except for the bearings, the only moving parts in the drive system of a vehicle that is driven by the invention are the wheels themselves. Each wheel is rotatably supported by two sets of bearings on a stationary axle. The drive system is coupled by a magnetic field interacting between a plurality of stationary electromagnetic poles within the wheel and permanent magnets that are fastened along the periphery to the axially opposing sides of the rotating motor housing. The entire system can be contained within a standard automobile tire rim. Within the motor housing, a microprogrammed controller accommodates forward, neutral, and reverse thrust. Dual-function thyristors provide brushless commutation during motor operation as well as voltage rectification during generator operation. The dual characteristics of the electromagnetic field poles and electronic configuration within the wheel, contribute to the compactness of the design, ease of fabrication, and reduction in cost and number of components associated with separate realizations of motor and generator assemblies.

Power losses from mechanical drive system couplings are eliminated. There are no moving parts to cause noise pollution; and the wheel is virtually free of devices that are subject to mechanical failure. The complete absence of gear reductions, chain or belt drives, transmission, rotating axles, differentials, universal joints, and brushes, is in distinctive contrast to the drive systems of vehicles powered by the internal combustion engine or the conventional electric vehicle motor.

Power in each of the wheels of a vehicle equipped with this invention affords many advantages over other rear-wheel drive, front-wheel drive, or conventional four-wheel drive vehicles that require complex differential gearing to compensate for the different rotation rates of the wheels, particularly when the vehicle is in the process of turning. Since there are no mechanical couplings to restrict the maneuverability of the wheels, and because each wheel is controlled by independent commutation circuitry, there is no need to de-couple any of the wheels when the vehicle is driven on hard surfaces. Furthermore, the self-compensating characteristics of the wheel reduce the skid and slip hazards normally encountered in conventional vehicles on wet, icy, or otherwise slippery surfaces.

Conventional vehicles waste the kinetic energy of the vehicle in the form of heat that is generated during friction braking. Because the invention serves not only as a motor to drive a vehicle, but as a power recovery generator during braking, loss of energy due to friction heat is minimized. Through the implementation of regenerative braking, some of the power consumed in operating the vehicle is returned to the batteries during braking. The mechanical brake required by existing codes is thus needed only when the kinetic energy of the moving vehicle is insufficient to effect dynamic braking or (more specifically) only at slow speeds and for stopping.

The power conversion circuitry consists of a transformer-less inverter circuit which has a load that is represented by the combined effective impedance of the electromagnetic field pole windings comprising the motor stator. The bulky transformer often required by inverter circuit designs is eliminated and thus affords a substantial reduction in size, weight, and power losses.

The wheel facilitates a preferred embodiment of the electronic control circuitry by incorporating thyristors as the principal current-controlling devices. Phase controlling the high-frequency sinusoidal waveform generated by the said inverter, ensures both smooth operation and efficient motor control at all vehicle speeds.

Additionally, the magnetic configuration of the wheel provides inherently smooth motor operation. In the particular embodiment of this invention, twelve stationary electromagnetic field poles of the stator, interact with twenty-two permanent magnet rotor poles to provide 132 almost imperceptible steps per revolution.

Silicon-controlled rectifiers (SCRs) in the power circuitry possess higher control gain and greater power-handling capability compared to transistors. With SCRs, the need for additional gain stages in transistor circuitry when low-level trigger signals are used is obviated. This advantage facilitates miniaturization of the low-level gate-trigger circuitry which consists of photon-coupled isolators which provide a sensitive gate configuration when used in conjunction with the power SCRs in the power circuitry. Hall effect sensors provide address information to a custom-masked read-only memory (ROM) which controls the bias current of infrared emitting diodes (IREDs) within the isolators. Utilization of a microprogrammed controller provides additional advantages, including minimization of random logic elements and, thus, increased reliability, ease of fabrication and printed circuit board assembly, miniaturization of the control circuitry suitable for mounting within the wheel housing, lower hardware and production costs, simplification of interfaces, and low power consumption.

It should be understood that the description herein is intended to be illustrative only. Those skilled in the art may conceive modifications to the embodiment shown and described. However, any such modifications which fall within the purview of the description are intended to be included herein as well. The scope of the invention is limited only by the claims appended hereto.

Having thus described a preferred embodiment of the invention, what is claimed is:

1. A motor having;
   rotor means comprising a plurality of permanent magnets each having opposite polarity poles,
   said permanent magnets arranged in a ring with the poles thereof aligned radially,
   said permanent magnets arranged so that the poles thereof are disposed with circumferentially alternate polarity, and
   stator means comprising a plurality of electromagnets arranged in a ring disposed adjacent said permanent magnets,
   said electromagnets each having poles arranged to distribute two symmetrically-split magnetic fields that interact with the opposing permanent magnets to provide electromotive torque.

2. The motor recited in claim 1 wherein,
   said rotor means includes a pair of rings of permanent magnets arranged with the poles thereof in alignment and facing toward each other,
   said stator means includes a pair of rings of electromagnets arranged with the poles thereof in alignment and facing away from each other,
   said stator means interposed between the pair of rings in said rotor means.

3. The motor recited in claim 2 wherein,
   said stator means includes support means for supporting said pair of rings of electromagnets,
   each said ring of electromagnets supported on opposite sides of said support means.

4. The motor recited in claim 3 wherein,
   each electromagnet in each of said rings of electromagnets comprises a pair of aligned magnetic cores and a common electrical coil thereon.

5. The motor recited in claim 1 including
   housing means for enclosing said rotor means and said stator means.

6. The motor recited in claim 5 wherein
   both said permanent magnet rotor means and said electromagnet stator means are displaced at the maximum radial distance within said motor housing means.

7. The motor recited in claim 6 including,
   controller means for supplying control signals to said stator means in response to input signals supplied to said controller means, and
   power current (−) controlling means for operating upon current signals associated with said stator means,
   each of the last named means contained within said housing means and supported by said stator means.

8. The motor recited in claim 7, wherein
   said controller means accommodates five user-programmable modes related to forward and reverse torque operating modes, forward and reverse regenerative braking modes, and neutral.

9. The motor recited in claim 8, wherein,
   said power current controlling means comprises of dual-functioning thyristors for both commutation of the electromagnetic stator poles during the motor operating mode, and polyphase rectification of the generated voltage during the braking mode.

10. The motor recited in claim 9 including,
    source means for supplying a high-frequency, sinusoidal signal,
    Hall-effect device means operative to modulate said sinusoidal signal to produce a cyclo-inverter waveform,
    said controller means and said dual-functioning thyristors function to commutate said electromagnets of said stator means with said cyclo-inverter waveform.

11. The motor recited in claim 10 wherein,
    said source means includes D.C. supply means,
    inverter silicon-controlled rectifier means connected in parallel with said supply means,
    inductive means connected in series with said silicon-controlled rectifier means,
    fast recovery diodes connected in parallel with said silicon-controlled rectifier means, and
    capacitive means connected from said supply means to said silicon-controlled rectifier means.

12. The motor recited in claim 5 wherein,
    the combined effective impedance of said electromagnets of said stator means is connected as the load for high-frequency inverter means located external to the motor housing.

13. The motor recited in claim 5 including,
    cooling means capable of dissipating thermal energy generated by said electromagnets and electronic power circuitry located within said motor housing.

14. The motor recited in claim 5 including,
    at least one radial fin means provided at the surface of said housing for the purpose of cooling the apparatus.

15. The motor recited in claim 5 wherein
    said housing means comprises a tire mounting rim.

16. The motor recited in claim 6 wherein said Hall-effect sensing means comprise three terminal digital switches.

17. The motor recited in claim 1 including,
    Hall effect sensing means means disposed adjacent to the poles of said permanent magnets to facilitate precise commutation of the fields of said electromagnets by means of simplified concentration of the magnetic flux produced by said permanent magnets.

18. The motor recited in claim 17 wherein,
    said Hall effect sensing means includes a Hall effect device, and
    at least one flux concentrator pole apparatus for concentrating magnetic flux from said permanent magnets into said Hall effect device.

19. The motor recited in claim 1 including brake means having an open center disc, internal caliper means having compound application characteristics in forward and reverse driving modes, said internal caliper means including double-ended brake shoe supports, a plurality of hydraulic cells for actuating said caliper means to bear against said disc in normal braking modes, and a plurality of elliptically-shaped cams for engaging said caliper means in emergency braking and parking.

20. The motor recited in claim 1 including, programmable control means which includes read-only memory (ROM) means, current source means, said ROM includes a plurality of address lines to which current is supplied from said current source and, buffer means connected to supply signals to said plurality of electromagnets, said ROM includes a plurality of output lines connected to said buffer means.

21. The motor recited in claim 20 including, photon-coupled isolators connected to said buffer means to control the application of signals to said electromagnets.

22. The motor recited in claim 1 including controller means, power conversion means connected to said controller means and to said electromagnets, brake circuit means connected to said electromagnets, mode selection means connected to said controller means, and speed control means connected to said controller means.

23. The motor recited in claim 22 including

Hall effect sensors associated with said permanent magnets and connected to supply signals to said controller means, and phase control means connected between said speed control means and said power conversion means.

24. The motor recited in claim 23 including source means, and regenerative braking means connected between said electromagnets and said source means, said source means connected to supply signals to said power conversion means.

25. The motor recited in claim 1 wherein, said stator means is mounted to be stationary on suitable axle means, and said rotor means is mounted on suitable bearings to rotate around said axle means.

26. The motor recited in claim 1 wherein, the number of permanent magnets included in said rotor means is larger than the number of electromagnets included in said stator means.

27. The motor recited in claim 1 wherein, said permanent magnets include rare-earth materials in the cores thereof.

28. The motor recited in claim 1 wherein, said permanent magnets have cores in which the central core portion is thicker than the end pole pieces.

29. A control circuit comprising:

power conversion circuitry;

said power conversion circuitry comprising, a plurality of inverter rectifiers of the controlled type;

a plurality of fast recovery rectifiers connected in parallel with respective inverter rectifiers; and reactive means connected between the parallel connected networks formed by said inverter rectifiers and said fast recovery rectifiers;

brushless commutation circuitry connected to said power conversion circuitry; p1 polyphase rectification circuitry;

said brushless commutation circuitry and said polyphase rectification circuitry each comprising gate controlled rectifiers;

said brushless commutation circuitry and said polyphase rectification circuitry being mutually exclusively operable;

inductive windings connected to said brushless commutation circuitry and to said polyphase rectification circuitry;

programmed controller means connected to said brushless commutation circuitry and to said polyphase rectification circuitry to control the operation thereof; and source means connected in said power conversion circuitry;

said brushless commutation circuitry connecting said power conversion circuitry to said inductive windings to supply energy to said inductive windings;

said polyphase rectification circuitry connected by said inductive windings to said power source to return energy to said power source.

30. The control circuit recited in claim 29 including:

full wave phase control means connected between said power conversion circuitry and said inductive windings to control the signal waveform at said inductive windings.

31. The control circuit recited in claim 29 wherein:

said programmed controller means includes read only memory means (ROM) which permits the programmed controller means to be programmed for forward or reverse operation.

32. The control circuit recited in claim 31 including:

switch means connected to supply information to said ROM.

33. The control circuit recited in claim 32 wherein:

said switch means comprise Hall effect digital switches.

34. The control circuit recited in claim 32 including:

manual control switches for controlling direction and speed of operation as a function of the circuit operation.

* * * * *